Aug. 5, 1924.  
F. O. PAHMEYER  
1,503,912  
FORM FOR MOLDING OR CASTING BOILER BAFFLES  
Filed March 31, 1924
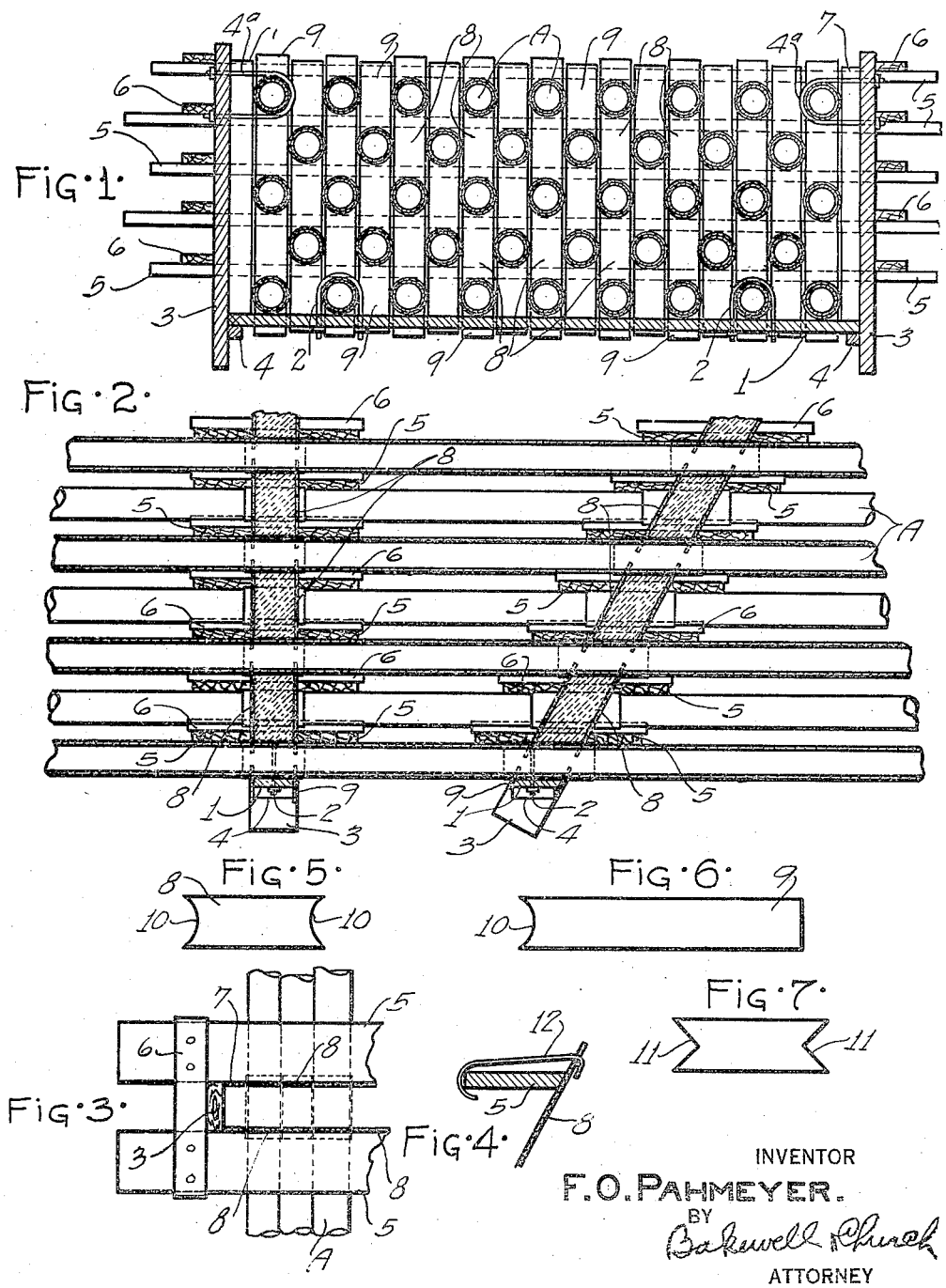

Patented Aug. 5, 1924.

1,503,912

UNITED STATES PATENT OFFICE.

FREDERICK O. PAHMEYER, OF ST. LOUIS, MISSOURI, ASSIGNOR TO HEINE BOILER COMPANY, OF ST. LOUIS, MISSOURI, A CORPORATION OF MISSOURI.

FORM FOR MOLDING OR CASTING BOILER BAFFLES.

Application filed March 31, 1924. Serial No. 703,151.

*To all whom it may concern:*

Be it known that I, FREDERICK O. PAHMEYER, a citizen of the United States, residing at St. Louis, Missouri, have invented a certain new and useful Improvement in Forms for Molding or Casting Boiler Baffles, of which the following is a full, clear, and exact description, such as will enable others skilled in the art to which it appertains to make and use the same.

This invention relates to baffles for water tube boilers of the kind that are formed wholly or partly from a plastic or semi-plastic substance that is cast or molded around the water tubes of the boiler, so as to produce a transverse partition or wall through which said water tubes extend.

In constructing boiler baffles of the general type referred to it was the general practice prior to my invention to build a "wooden form" by arranging slats diagonally between the water tubes after said tubes had been combined with the headers, drums or water boxes of the boiler, so as to produce two parallel retaining walls, and then fill the space between said retaining walls with a comparatively wet mixture of special fire clay or other suitable material that will dry or harden. In some instances tile were arranged between the tubes so as to form diagonally-disposed rows of tile arranged in parallel relation and the spaces between said rows of tile were filled with plastic cement or the like. One serious objection to a form composed of slats arranged diagonally between the water tubes is that it is not tight enough to eliminate the possibility of some of the baffle material escaping from the form, and thus causing "voids" in the baffle which eventually result in gas leaks that reduce the efficiency of the boiler; another objection to such a form is that the wooden slats that constitute the retaining walls or side walls of same are apt to bend outwardly intermediate their ends under the pressure of the baffle material, thus producing a baffle of uneven thickness; and another objection to such a form is that the long, diagonally-disposed slats that constitute the side walls of same are in the way of the workmen if the baffle is built progressively, as the tubes of the boiler are being installed or put in place. Moreover, when a baffle is constructed from a comparatively "wet mix" of baffle material there is a tendency for the baffle material to sink to the bottom of the form before said material "sets", thus making the lower part of the baffle more dense than the upper part and producing a baffle whose upper portion is porous and liable to leak.

One object of my invention is to provide a form for molding or casting transverse boiler baffles formed wholly or partly of plastic or semi-plastic material, that will not interfere with the workmen in the event the baffle is built up progressively as the tubes are being installed or put in place, thereby making it practicable to use a comparatively thick or stiff baffle mixture that can be rammed into the form or tamped in place, and consequently, producing a baffle of uniform density throughout its entire area that is free of voids or other imperfections that will eventually result in gas leaks forming in the baffle.

Another object is to provide a form for molding or casting boiler baffles of the general type mentioned, that can be erected quickly and which is constructed in such a way that the side wall portions of same will not bulge outwardly and thus produce a baffle of unequal thickness.

Another object is to provide a form for molding or casting transverse boiler baffles, which is constructed in such a manner that the parts of same can be easily disassembled, thereby making it practicable to use the same form for building numerous baffles.

And still another object is to provide a novel method of constructing transverse boiler baffles. Other objects and desirable features of my invention will be hereinafter pointed out.

To this end I have devised a form for molding or casting transverse boiler baffles formed wholly or partly of plastic or semi-plastic material, that consists of a frame of skeleton construction which comprises numerous pairs of spaced members arranged in parallel relation between the tubes of the boiler, and relatively short side wall members interposed between the boiler tubes and combined with the pairs of spaced parallel members of the frame in such a way as to produce two retaining walls for the baffle material that have sufficient rigidity to prevent them from flexing or bulging outwardly, even when the baffle material is rammed or tamped into the form. The frame above referred to comprises a bottom member that extends transversely of the tube bank and two end members arranged in an upright position at the sides of the tube bank. The frame members and the side wall members can be formed either of wood or of metal, and said members can be combined and arranged in various ways without departing from the spirit of my invention. In the embodiment of my invention herein illustrated the bottom member of the frame is used to determine the thickness of the baffle and is arranged transversely of the tube bank at the point where the baffle is to be erected. The end members of the frame are used to determine the shape of the baffle and also to hold the pairs of parallel members in spaced relation, said end members being straight and arranged in a vertical position or in an inclined position when a flat baffle is to be formed, being curved when a curved baffle is to be formed and being of angular shape when the baffle to be formed is provided with two or more portions disposed at an angle to each other. The pairs of parallel members of the frame with which the side wall members of the form co-act are arranged horizontally, transversely of the tube bank in superimposed relation so as to form cross pieces, and the two members constituting each of said pairs are held spaced apart by the end members of the frame. The side wall members previously referred to are arranged in an upright position between the horizontally-disposed water tubes of the boiler and are so disposed with relation to the pairs of cross pieces of the frame that said cross pieces resist the strains erected on the side wall members by the baffle material in a direction tending to cause the side walls of the form to bulge outwardly. It is immaterial how the various frame members are connected together and sustained in position, but one convenient way of assembling and mounting the frame is to detachably connect the bottom member to one or more of the boiler tubes by U-bolts or straps, detachably connect the ends of said bottom member to the end members of the frame by cleats or any other means that will enable said parts to be easily assembled and disassembled, mount the pairs of horizontally-disposed cross pieces on the boiler tubes, and hold said pieces in engagement with the end members of the frame by devices connected to the end portions of said cross pieces that project laterally beyond said end pieces. The side wall members of the form consist of short pieces of thin board or short pieces of sheet metal having the ends of same formed in such a way that they can be arranged vertically between the boiler tubes so as to form two parallel retaining walls that extend transversely of the tube bank. The members that constitute each of said retaining walls are arranged edge to edge and also in longitudinal alignment with each other, and in most instances the side wall members of the form will be temporarily connected to the cross pieces of the frame so as to hold them in position while the baffle material is being introduced into the form. After the baffle material has been introduced said material exerts pressure on the side wall members in a direction to hold them pressed against the transverse cross pieces of the frame.

The form above described can be erected in a complete tube bank, all of whose tubes are in operative position, or it can be built up progressively as the water tubes of a horizontal tube boiler are being installed, thereby enabling a baffle to be built progressively by tamping baffle material into the form. When the baffle is formed of relatively thick or stiff baffle material, or formed partly of tile and partly of plastic or semi-plastic baffle material, the bottom member of the form is arranged in operative position after one or more of the horizontal rows of tubes at the lower side of the tube bank have been installed, and the end members of the frame are then arranged in an upright position at the sides of the tube bank and connected to the ends of said bottom member. As each horizontal row of boiler tubes is installed two transversely-disposed cross pieces are laid upon same and drawn into engagement with the end members of the frame, and as the operation of building up the cross pieces of the frame proceeds, the side wall members are arranged between said cross pieces. After the form has been built up to a certain height baffle material or baffle material and tile are introduced into the form and the plastic material rammed or tamped, thus forming the lower portion of the baffle, and as the installation of the boiler tubes proceeds, the form is built up progressively and filled with the material or substance that constitutes the baffle. It will thus be seen that in my method of constructing a transverse boiler baffle from relatively stiff baffle material or relatively stiff baffle material and tile, the form is built up progressively as the boiler tubes are installed or arranged in operative position. Accordingly, such a method makes it possible to produce, at a low cost, a baffle that is of uniform solidity throughout its entire area as the form members are not in the way of the workmen and do not interfere with the operation of tamping or ramming the baffle material so as to consolidate same sufficiently to insure a baffle that is solid, durable and free of voids through which gases can short-circuit.

Figure 1 of the drawings is a vertical transverse sectional view of the tube bank, of a horizontal tube boiler showing my improved form arranged in operative position, some of the members of the frame of the form being shown in section.

Figure 2 is a vertical longitudinal sectional view of a tube bank that is equipped with a vertical transverse baffle and an inclined transverse baffle, illustrating in section the forms used in casting or molding said baffles.

Figure 3 is a detail top plan view, illustrating how the end members of the frame hold the pairs of cross pieces of the frame in spaced relation.

Figure 4 is a detail sectional view, illustrating one means that can be used for retaining the side wall members of the form in operative position.

Figure 5 is a plan view of a side wall member that is adapted to be positioned between two horizontally-disposed water tubes arranged in vertical alignment with each other.

Figure 6 is a top plan view of a side wall member that is adapted to be positioned between a boiler tube and the bottom member of the frame; and Figure 7 is a top plan view of a side wall member that can be used in the construction of a baffle formed from relatively thick or stiff baffle material.

In the drawings A designates the water tubes of a horizontal tube boiler, said tubes being arranged so as to form a plurality of horizontal rows of tubes that constitute a tube bank. The ends of said tubes are connected to water legs, water boxes or sectional headers (not shown) and one or more transverse baffles are arranged in said tube bank so as to cause the gases escaping from the combustion chamber of the boiler to flow crosswise of said tube bank.

My invention relates to transverse baffles of the kind referred to that are formed from plastic or semi-plastic baffle material that is introduced into a form wherein it sets or hardens and baffles formed partly of tile and partly of plastic or semi-plastic material. One feature of my invention consists of a form of novel construction that is adapted to be used in constructing a baffle in a complete tube bank, all of whose tubes are arranged in operative position, or used in the construction of a baffle that is built up progressively as the tubes of the boiler are installed or arranged in operative position in the tube bank. Another feature of my invention consists of a novel method of constructing a boiler baffle which makes it practicable to construct a transverse baffle from relatively stiff or thick baffle material that is cast or molded around the boiler tubes. My improved form and method are applicable to vertical baffles, as shown at the left hand side of Figure 2, to inclined baffles, as shown at the right hand side of Figure 2, the curved baffles and to transverse baffles that are made of a plurality of portions disposed at an angle to each other.

As previously stated, my improved form consists of a frame that comprises a bottom member 1 arranged transversely of the tube bank and connected to a horizontal row of tubes at or adjacent the lower side of the bank by one or more U-bolts or straps 2, said bottom member consisting of a strip of wood or of metal whose width corresponds to the thickness desired for the finished baffle. End members 3 are arranged in an upright position at the sides of the tube bank so as to form the end walls of the space into which the baffle material is introduced, which end members may be either straight, curved or of angular shape. In constructing a vertical baffle, as shown at the left hand end of Figure 2, the members 3 are arranged in upright position, and in constructing an inclined baffle, as shown at the right hand end of Figure 2, the members 3 are arranged in an inclined position. The end members 3 are detachably connected to the bottom member 1 by any suitable means, such, for example, as by cleats 4 nailed to said parts, and if desired, U-bolts 4$^a$ can be used for connecting the end members 3 to some of the tubes in the side portions of the bank, as shown in Figure 1, so as to hold said end members in an upright position. The end members 3 are formed from strips of wood or metal and the width of said end members is equal to the thickness of the baffle, plus twice the thickness of the side wall members of the form, hereinafter described. The frame also comprises a plurality of pairs of horizontally-disposed cross pieces 5 arranged transversely of the tube bank with their end portions bearing against the end members 3 of the frame. These cross pieces 5 are preferably supported on the boiler tubes A and the two cross pieces constituting each of said pairs are held in spaced relation by the end members 3 of the frame, as shown in Figure 3. The cross pieces 5 can be formed from strips of wood or metal arranged flatwise on the boiler tubes, and any suitable means can be used for holding said cross pieces 5 in engagement with the end members 3, the means herein illustrated for this purpose consisting of cleats 6 that are nailed or otherwise detachably connected to the portions of the cross pieces 5 that project laterally beyond the end members 3 of the frame, as shown in Figure 3. In building a baffle in an old boiler or in a tube bank all of whose tubes are arranged in operative position, the frame just described is erected prior to the operation of introducing the baffle material into the form, but in building a baffle in a new boiler the said frame is built up progressively, as the rows of tubes constituting the tube bank are being installed.

The side walls of the form are composed principally of relatively short side wall members 8 that are arranged in an upright position between vertically-aligned boiler tubes A and side wall members 9 that are arranged at the top and bottom of the form. If desired, relatively long side wall members 7 can be arranged between the vertical rows of tubes at the sides of the bank and the end members 3 of the frame, in case it is desired to produce a baffle whose end portions project into the side walls of the boiler setting. The side wall members 7, 8 and 9 are preferably formed from thin strips of wood or sheet metal of a width substantially equal to the diameter of the boiler tubes A and of such thickness that the inner faces of the side wall members at the lower end of the form will bear against the edges of the bottom member 1 of the frame and the outer faces of said side wall members will bear against the inner edges of the bottom pair of cross pieces 5 of the frame when said side wall members are arranged in parallel relation. The only difference between the side wall members 8 and 9 is that each of the members 8 has both of its ends curved at 10, as shown in Figure 5, so as to permit said member to be arranged in an upright position between two vertically-aligned boiler tubes, as shown in Figure 1, whereas, each of the side wall members 9 is provided with a square end and a curved end 10, as shown in Figure 6, it being unnecessary to curve both ends of the side wall members 9, due to the fact that said members are arranged either in engagement with the bottom member 1 of the frame or in engagement with next to the top row of tubes of the tube bank, as shown in Figure 1. If the baffle is constructed from baffle material that is relatively stiff or thick, it is not essential that the ends of the side wall members 8 and 9 be curved so as to fit the boiler tubes, and in such instances the portions of the side wall members 8 and 9 that bear against the boiler tubes may be made V-shaped, as indicated by the reference characters 11 in Figure 7.

After one or more pairs of the cross pieces 5 at the lower end of the frame have been arranged in operative position, the side wall members 8 and 9 that are to constitute the bottom portions of the retaining walls of the form are arranged in an upright position between said pairs of cross pieces, as shown in Figures 1 and 2, said members 8 and 9 being arranged edge to edge in two parallel rows that extend transversely of the tube bank. Said side wall members are so arranged that they embrace the bottom member 1 of the frame, to which they are detachably connected by nails or brads, and as previously stated, they are arranged between the cross pieces 5 in such a way that said cross pieces are positioned on the outside of the two retaining walls of the form. In order to insure the side wall members 8 and 9 remaining in operative position, it is preferable to detachably connect said side wall members to the cross pieces 5 either by brads or small nails, or by means of wire hooks 12, as shown in Figure 4. When a baffle is being constructed progressively by erecting portions of the retaining walls of the form and then introducing baffle material into same, only a relatively few hooks 12 are required to retain the side wall members in position, owing to the fact that, after one horizontal row of side wall members have been arranged in operative position and filled with baffle material, the force or pressure which said baffle material exerts on said side wall members holds them in operative engagement with the cross pieces 5 of the frame. In instances where the baffle being formed is constructed partly of tile and partly of plastic material, it is not necessary to detachably connect the side wall members 8 and 9 to the cross pieces 5 of the frame, as above described, due to the fact that the tile used in the construction of the baffle are of the same width as the space between the two retaining walls of the form, and consequently, will act to hold the side wall members 8 and 9 in engagement with the cross pieces 5 of the frame. In order to insure vertical alignment of the side wall members of the form and insure an even bearing of said members on the cross pieces 5 of the frame, it is preferable to form the inner edges of said cross pieces so that the members 7, 8 and 9 that constitute the side walls of the form will bear flat against said cross pieces. Thus, when a vertical baffle is being formed the inner edges of the cross pieces 5 are made square, whereas, when an inclined baffle is being formed, as shown at the right hand side of Figure 2, the inner edges of said cross pieces 5 are beveled at the same angle as the baffle.

Wherever it is possible to do so I prefer to build up the form progressively and introduce the baffle material into the form progressively as the boiler tubes are installed in the boiler, as this method of constructing a boiler baffle makes it possible to ram or tramp the baffle material into the form in such a way as to produce a solid baffle of uniform density throughout its entire area. This is not possible, however, when a baffle is being constructed in an old boiler all of whose tubes are arranged in operative position, and accordingly, in constructing a baffle in an old boiler, the form is completely erected and the baffle material is thereafter introduced into same. After the material of which the baffle is constructed has set or hardened the frame and the members that constitute the side walls of the form can be disassembled and subsequently used in constructing other baffles.

A form of the construction above described is superior in many ways to the forms heretofore used for casting or molding transverse boiler baffles. For example, there is no danger of the side walls of the form bulging outwardly, and thus producing a baffle of uneven thickness, due to the fact that the outward thrust which the baffle material exerts on the side walls of the form is resisted by cross pieces 5 arranged edgewise on the boiler tubes. In instances where the baffle is built up progressively the members from which the form is constructed are not in the way of the workmen who are installing the boiler tubes or who are introducing the baffle material into the form, and accordingly, the baffle can be built rapidly and perfectly. Still another desirable feature of such a form is that the members that constitute the side retaining walls of the form can be assembled and combined with the boiler tubes in such a way as to form retaining walls that are sufficiently tight to confine the baffle material, and which are of such shape or form that the baffle cast or molded in the form will have smooth side walls.

Having thus described my invention, what I claim as new and desire to secure by Letters Patent is:

1. A form for molding or casting boiler baffles, consisting of a frame that comprises a plurality of pairs of parallel members arranged in the tube bank of the boiler in spaced relation, and two retaining walls arranged transversely of the tube bank and formed from said wall members that are arranged between the boiler tubes in engagement with the inner edges of said pairs of parallel members.

2. A form for molding or casting transverse boiler baffles, comprising two retaining walls arranged transversely of the tube bank of the boiler in spaced relation and each formed from a plurality of side wall members that are arranged between the boiler tubes, and frame members arranged on the outside of said side wall members for preventing the side walls of the form from bulging outwardly.

3. A form for molding or casting transverse boiler baffles, comprising two retaining walls arranged transversely of the tube bank of the boiler in spaced relation and each formed from a plurality of side wall members arranged edge to edge in an upright position, and frame members in the tube bank that resist movement of said side wall members in a direction to cause the side walls to bulge outwardly.

4. A form for molding or casting transverse boiler baffles, comprising two transversely-disposed retaining walls, each of which is formed from a plurality of members that are adapted to be arranged edge to edge in an upright position between the tubes of the boiler, and a plurality of frame members in the tube bank arranged on the outside of each retaining wall for resisting outward movement of the members constituting said wall.

5. A form for molding or casting transverse boiler baffles, comprising two spaced retaining walls arranged transversely of the tube bank and each composed of a plurality of members arranged in an upright position between the boiler tubes, and a frame sustained by the tubes of the boiler and comprising members arranged on the outside of said walls for preventing the same from bulging outwardly.

6. A form for molding or casting transverse boiler baffles, comprising two spaced retaining walls arranged transversely of the tube bank and each composed of a plurality of members arranged in an upright position between the boiler tubes, and pairs of horizontally-disposed frame members arranged transversely of the tube bank on the outside of said walls for resisting outward movement of the members constituting said walls.

7. A form for molding or casting transverse boiler baffles, comprising side walls arranged transversely of the tube bank of the boiler and each composed of a plurality of members that are arranged in an upright position between the boiler tubes, and a frame for retaining said side wall members in position comprising pairs of members on the outside of said walls and end members that hold said side walls in spaced relation.

8. A form for molding or casting transverse boiler baffles, comprising two side walls arranged transversely of the tube bank and each composed of a plurality of members that are arranged in an upright position between the boiler tubes, and a frame for retaining said side wall members in position comprising a bottom member that closes the lower end of the space between said walls, end members that close the ends of said space, and pairs of transversely-disposed members on the outside of said side walls that prevent the same from bulging outwardly.

9. A form for molding or casting transverse boiler baffles, comprising a bottom member arranged transversely of the tube bank that determines the thickness of the baffle, end members at the sides of the tube bank that determine the shape of the baffle, transversely-disposed side walls, each of which is made up of parts arranged in an upright position between the boiler tubes, and means for resisting outward movement of said side wall members when the baffle material exerts pressure on same.

10. A form for molding or casting transverse boiler baffles, comprising a bottom member arranged transversely of the tube bank that determines the thickness of the baffle, end members at the sides of the tube bank that determine the shape of the baffle, transversely-disposed side walls, each of which is made up of parts arranged in an upright position between the boiler tubes, and pairs of transversely-disposed cross pieces in the tube bank arranged on the outside of said side walls, with the inner edges of the end portions of same contacting with said end members.

11. A form for molding or casting transverse boiler baffles, consisting of a frame comprising a bottom member arranged transversely of the tube bank, end members arranged at the sides of the tube bank in an upright position and pairs of horizontally-disposed cross pieces arranged transversely of the tube bank and maintained in spaced relation by said end members, and two retaining walls arranged between the cross pieces of said frame and each composed of a plurality of members arranged in an upright position between the boiler tubes in engagement with the inner edges of said cross pieces.

12. A form for molding or casting transverse boiler baffles, consisting of a frame comprising a bottom member arranged transversely of the tube bank and detachably connected to some of the tubes at the lower side of the bank, end members arranged in an upright position and detachably connected to said bottom member, pairs of horizontally-disposed cross pieces arranged transversely of the tube bank and maintained in spaced relation by said end members, means for preventing the cross pieces constituting said pairs from spreading, and side wall members arranged between the boiler tubes in engagement with the inner edges of said cross pieces.

13. A form for molding or casting transverse boiler baffles, consisting of a frame comprising pairs of horizontally-disposed cross pieces arranged transversely of the tube bank, two transversely-disposed retaining walls arranged transversely of the tube bank between said cross pieces and each composed of a plurality of members arranged in an upright position between the boiler tubes, and means for holding said side wall members in engagement with said cross pieces.

14. A form for molding or casting transverse boiler baffles, comprising two retaining walls arranged transversely of the tube bank and each composed of a plurality of members arranged edgewise between the tubes and having their ends shaped to fit the tubes, and a frame comprising members arranged on the outside of said walls for resisting outward movement of the members constituting said walls.

15. A form for molding or casting transverse boiler baffles, comprising pairs of horizontally-disposed cross pieces arranged flatwise on the tubes of the boiler and extending transversely of the tube bank, end members arranged in an upright position between the pieces constituting said pairs for holding them in spaced relation, and relatively thin side wall members arranged edgewise in an upright position between the tubes of the boiler in engagement with the inner edges of said cross pieces.

16. A method of constructing a transverse baffle for a water tube boiler, characterized by erecting a form progressively as the horizontal rows of tubes of the boiler are being installed, introducing relatively stiff or thick baffle material into said form progressively as the form is built up, and ramming or tamping said baffle material in place.

17. A method of forming a transverse baffle for a horizontal tube boiler, characterized by installing a horizontal row of tubes at the lower side of the tube bank, erecting the lower portion of a form that comprises two transversely-disposed retaining walls, filling the space between said walls with relatively thick or stiff baffle material, and ramming said material into place, installing another horizontal row of tubes in the tube bank, erecting another section of the form and filling it with baffle material, and arranging pairs of horizontally-disposed cross pieces transversely of the tube bank as each horizontal row of tubes is installed so as to prevent the side walls of said form from bulging outwardly.

18. A method of forming a transverse baffle for a horizontal tube boiler, characterized by arranging a plurality of side wall members between the tubes at the lower side of the bank after said tubes have been installed so as to form two parallel retaining walls that extend transversely of the tube bank, filling the space between said walls with baffle material, building up said retaining walls progressively as the various horizontal rows of tubes of the tube bank are installed, and arranging pairs of horizontally-disposed cross pieces flatwise on the horizontal rows of tubes so as to resist bulging of the retaining walls of the form.

19. A method of constructing a transverse baffle for horizontal tube boilers, characterized by arranging the bottom member of a form transversely of the tube bank of the boiler and detachably connecting it to the bottom row of tubes, arranging end members in an upright position at the sides of the bank and detachably connecting them to the bottom member of the form, arranging a pair of horizontally-disposed cross pieces on the upper side of the bottom row of tubes in such a way that the inner edges of said cross pieces bear against said end members, tying said cross pieces together so as to prevent them from spreading, arranging side wall members in an upright position between the tubes and in engagement with the inner edges of said cross pieces so as to form the retaining walls of the form, filling the space between said walls with baffle material, building up said retaining walls progressively as each horizontal row of tubes of the boiler is installed, and arranging a pair of cross pieces transversely of each of said rows of tubes so as to resist outward movement of the side wall members of the form.

FREDERICK O. PAHMEYER.